Sept. 19, 1967 C. F. MILLER 3,342,396

AIR SPINDLE FOR BONDING MACHINES

Filed March 8, 1965 2 Sheets-Sheet 1

Inventor:
Charles Fredrick Miller
By Bair, Freeman & Molinare Attys.

Sept. 19, 1967 C. F. MILLER 3,342,396

AIR SPINDLE FOR BONDING MACHINES

Filed March 8, 1965 2 Sheets-Sheet 2

Inventor:
Charles Fredrick Miller
By Bair, Freeman & Molinare Attys.

United States Patent Office 3,342,396
Patented Sept. 19, 1967

3,342,396
AIR SPINDLE FOR BONDING MACHINES
Charles Frederick Miller, Anaheim, Calif., assignor to Basic Products Corporation, Milwaukee, Wis.
Filed Mar. 8, 1965, Ser. No. 437,980
10 Claims. (Cl. 228—3)

This invention relates to a new means for developing and controlling mechanical force with relative freedom from the interfering effects of friction, inertial and kinetic forces. In particular, the invention relates to a system whereby reciprocating tools in heavy mountings may be easily controlled while eliminating conventional counterbalancing.

The invention finds particular application in equipment for assembling the delicate components of semi-conductor devices including die and wire bonding of semi-conductor headers. Adjustment of size and proportions of the elements of the system permits adaptation to many applications including those where relatively large force requirements are involved.

Conventionally, semi-conductor bonding equipment involves use of weighted bonding tools wherein the tip of the bonding tool is contacted with the work piece, normally a ceramic disc, and a wire or minute metal die is bonded under pressure to the disc. Such a system is however difficult to control and often results in cracked discs due to excessive downward pressure of the tip.

Prior art die bonding equipment also has the disadvantage of employing lateral vibrating forces of the bonding tip against the die to effect a bond of the die to the ceramic header. This involves lateral scrubbing of the die which may disadvantageously result in die damage.

It is thus an object of this invention to provide a low inertia force system by which relatively heavy tools may be reciprocally moved and controlled with precision.

It is a further object of this invention to provide a tool useful for bonding wires and dies to semi-conductor materials which permits application of high bonding point pressures without the necessity of counterbalanced assemblies.

It is another object of this invention to provide means for controlling a bonding tool wherein the tool may be vibrated axially to effect bonding of dies to ceramic headers, without lateral scrubbing.

Other objects will become apparent as the invention is hereinafter more fully described.

In essence the invention contemplates an air piston including a spindle to which may be attached a bonding tool. The spindle comprises an axially movable shaft with opposed piston surfaces of different areas, the shaft being movable within a housing between defined upper and lower limits. The spindle is in a housing which is maintained at pressures greater or less than atmospheric so that the difference in piston areas and the pressure of gas supplied to the housing determine the force required to move the spindle by application of force axial to the spindle. Preferably, gas bearings are used to reduce friction of the spindle with the housing. By varying gas pressure, there is controlled the direction and amplitude of force required to move the spindle.

In one embodiment of the invention wherein the spindle is used in conjunction with a die bonder, there is employed electromagnetic means in the form of a solenoid coil surrounding a part of the spindle by which axial force may be intermittently added to or subtracted from that created by gas pressure.

The invention will be better understood from the drawings wherein.

Figure 1:
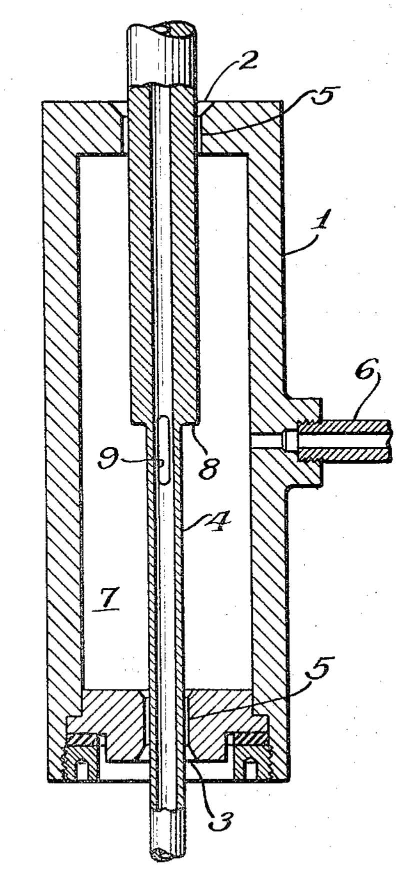
FIG. 1 illustrates diagrammatically in cross section a spindle and housing comprising the air piston as used in the invention.

The principle of the invention as illustrated in FIG. 1 wherein cylindrical housing 1 has openings 2 and 3 of different diameters in its ends. Rod 4 extends through the housing and openings 2 and 3 which are oversized with respect to the portions of rod 4 passing therethrough to provide an annulus 5 through which gas may flow. The resultant gas bearings separate the rod and housing and eliminate friction therebetween. Rod 4 may be tubular, as shown in FIG. 1, or solid, and it is provided with a shoulder 8 joining the end portions of different diameters.

Housing 1 has inlet 6 through which gas is either supplied or exhausted from chamber 7. When gas is supplied so that chamber 7 is maintained at pressures greater than the presure external of housing 1, rod 4 is urged toward the larger opening 2 (up in FIG. 1) due to the net upward force on shoulder 8. Conversely, when chamber 7 is maintained at pressure less than that external to housing 1, rod 4 tends to move down toward the smaller opening 3 due to the differential piston areas at either end of the rod. Thus by regulating the pressure in chamber 7 through any conventional means (not shown), rod 4 is urged axially in housing 1 either up or down and with any desired force.

During operation, gas is either forced out or drawn in through air bearings 5 at 2 and 3 so that rod 4 rides freely in the housing and can be moved substantially without friction.

When rod 4 is tubular, a port 9 comprising an elongated slot is provided so that the interior of rod 4 communicates with chamber 7. In this way pressure or vacuum may be supplied to the ends of rod 4 for use with any tool connected thereto.

Figure 2:
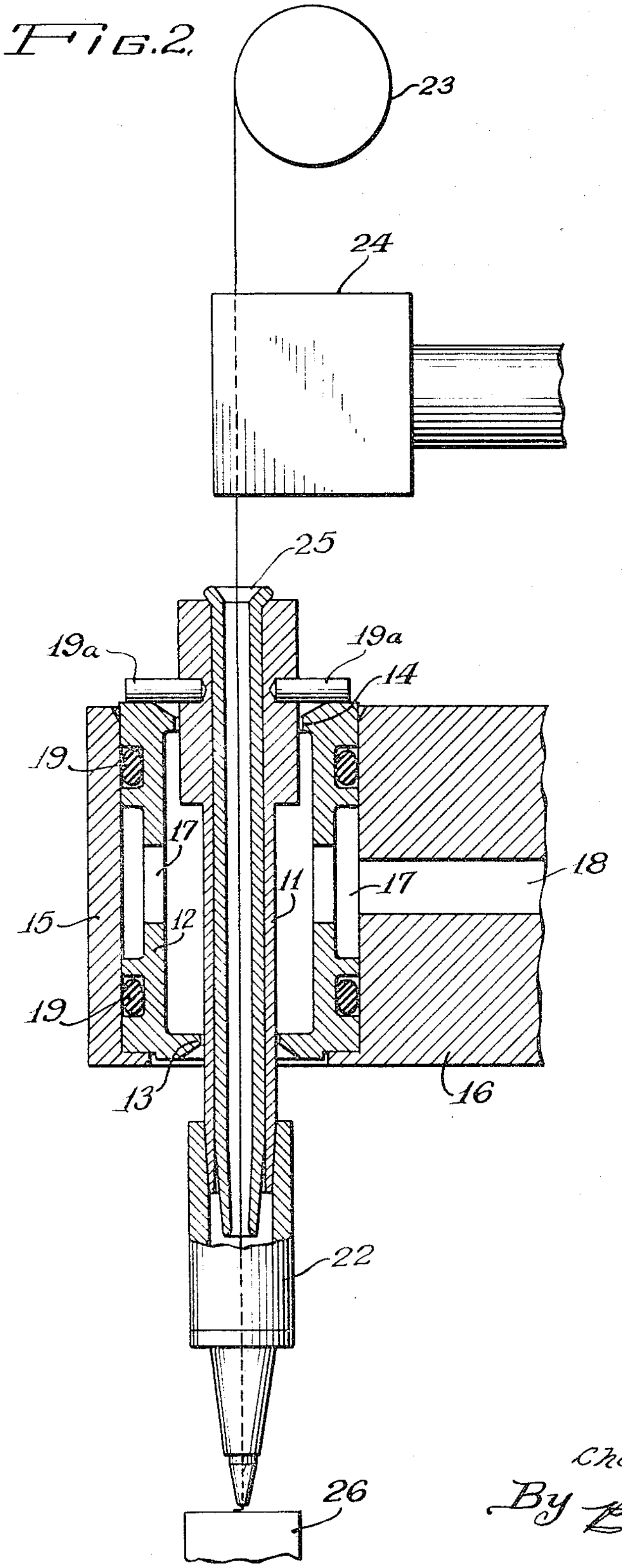
FIG. 2 is a side view, partially in section, of a wire bonding tool showing in combination the air piston and wire feed and storage means.

FIG. 2 illustrates one embodiment including a particular application of the invention namely an apparatus for wire bonding. There is shown a tubular rod 11 mounted for vertical movement in a housing 12. Rod 11 has a lower end portion of reduced diameter and an upper end portion of enlarged diameter passing loosely through air bearing openings 13 and 14 respectively at the lower and upper ends of the housing 12. The housing is mounted in a vertical socket 15 at the outer end of a tubular arm 16 and is formed intermediate its ends with one or more openings 17 communicating with a passage 18 in the arm. Preferably seals such as O-rings 19 are provided between the housing and socket at opposite sides of the openings 17.

Secured to the upper enlarged part of rod 11 external to housing 12 is a stop pin 19*a* which prevents rod 11 from moving down into the housing any further than is shown in FIG. 2. Pin 19*a* comprises short dowels attached to rod 11 at its periphery.

The embodiment above described in FIG. 2 is adapted for use with a bonding tool for wire bonding. For this purpose rod 11 carries a bonding head and needle, shown generally at 22. Wire may be fed from a reel shown diagrammatically at 24. Wire from reel 23 is fed downward through a tube 25 in the rod 11 and through bonding head 22. The bonding operation per se, in conjunction with operation of wire source 23 and feed mechanism 24, is as described in copending applications which have matured into the following patents: Patent No. 3,307,761, issued Mar. 7, 1967; Patent No. 3,325,070, issued June 13, 1967; and Patent No. 3,319,859, issued May 16, 1967.

As shown in FIG. 2, a source of reduced pressure (not shown) communicates through passage 18 to housing 12.

Gas, normally air, is drawn through air bearings 13 and 14 from atmosphere, thus providing a free floating rod or spindle. As shown in FIG. 2, reduced pressure in the chamber of housing 12 will cause rod 11 to be urged downward until pin 19*a* abuts the top of housing 12. The force with which rod 11 is urged downward depends on the degree of reduced pressure and the difference in cross-sectional areas of the two sections of rod 11.

In operation to bond wire to a work piece, shown diagrammatically at 26, bonding head 22 must be lowered so that its needle tip through which wire protrudes contacts the work piece. To lower head 22, tubular arm 16, which is integral with a vertical slide assembly (not shown) is lowered by means of manual operating levers (not shown). The mechanism for raising and lowering arm 16 per se forms no part of this invention. Rod 11 moves down with arm 16 as a unit until the needle tip contacts the work piece at which time arm 16 continues down to a predetermined lower limit and the force of gas pressure urging rod 11 down then acts on the needle tip and the wire to effect a bond between the wire and work piece.

It can be seen that an important feature of the air spindle used in conjunction with the bonding head is that inertia loading of the needle upon the work is minimized because the spindle may be of very light construction so that the only significant force acting downward is the force created by gas pressure. This is of particular advantage when arm 16 is moved by manual operation of a control lever since in such operation the rate of approach of the needle tip to the work piece may be varied by the operator. Thus, use of the air spindle eliminates any undesirable effect of this variation as is experienced using more massive counterbalanced assemblies.

Figure 3:
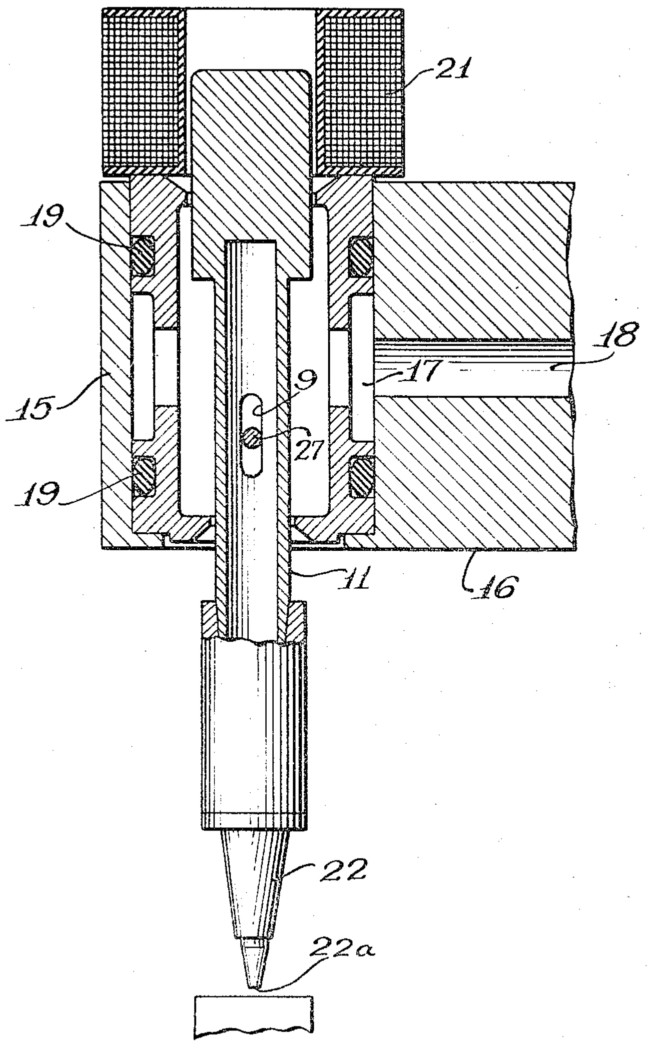
FIG. 3 is a side view, partially in section, of a die bonding tool showing in combination the air piston and electromagnetic coil as used in the invention.

Another embodiment of the invention, shown in FIG. 3, illustrates the air piston in conjunction with a die bonder. The numerals of FIG. 3 identify parts corresponding to FIG. 2. When used as a die bonder, rod 11 preferably is provided with a port 9 (similarly as shown in FIG. 1) by which the interior of rod 11 communicates with housing 12. By using a reduced gas pressure source, as above described in FIG. 2, and proper arrangement of rod 11 with respect to bonding head 22 as shown in FIG. 3, head 22 is made to communicate with the reduced pressure source so that a die will be attracted and picked up by the reduced pressure at the tip, 22*a* of head 22. In this way, the bonding tip holds the die prior to bonding by utilizing the reduced pressure necessary to operate the air spindle.

To limit vertical movement of rod 11, there is provided a pin 27 which extends through port 9 of rod 11 and limits the extent of vertical movement of rod 11 to the length of port 9. The pin is secured either to housing 12 or to arm 16 and prevents rotation of rod 11 in the housing as well as limiting the extent of vertical movement.

In the preferred embodiment of the die bonder as shown in FIG. 3, there is provided at the upper end of the rod 11 means to attract the rod in an axial direction, preferably an electromagnetic coil 21 which surrounds the upper end of the rod. On energizing the coil with alternating current, preferably of 60 cycles per second or higher, the rod is subjected to intermittent upward forces which diminish the force created by the gas pressure in the housing. Such upward forces are created by the tendency of the upper part of rod 11 to center itself in coil 21. Coil 21 is energized while head 22 is in bonding position, thus creating the intermittent axial force which subtracts from the force with which tool 22 presses the die to piece 26. This creates a pulsating force at the tool tip which is desirable to effect proper bonding of the die to the work piece surface. It should be noted all movement of rod 11 is in a vertical direction, thus eliminating horizontal movement of the bonding head and possible lateral scrubbing of the die by the bonding tip.

Movement of the tubular arm and bonding head in the die bonder embodiment of FIG. 3 is substantially identical with that described for FIG. 2. I.e. arm 16 is moved down until bonding tip 22*a* contacts the work piece. Arm 16 then continues down to a preset lower position while tip 22*a* exerts a force on the work piece due to gas pressure urging spindle 11 downward.

While but two embodiments of the invention have been shown and described herein, it will be understood that they are illustrative only and not to be taken as a definition of the scope of the invention, reference being had for this purpose to the appended claims.

I claim:

1. Device for developing and controlling mechanical force comprising a housing, openings in said housing adapted to accommodate a rod, a rod extending through said housing and out through said openings, said rod being of greater diameter at one of said openings than at the other, means communicating with said housing for maintaining gas pressure above or below atmospheric in said housing, means for limiting the extent of axial movement of said rod in said housing and means for moving said housing between predetermined limits.

2. Device for developing and controlling mechanical force comprising a housing, openings in said housing adapted to accommodate a rod, a rod extending through said housing and out said openings, said rod being of greater diameter at one of said openings than at the other, means communicating with said housing for maintaining gas pressure above or below atmospheric in said housing, means for limiting the extent of axial movement of said rod in said housing, means for moving said housing vertically between predetermined limits and means including an electromagnetic coil adapted for axially vibrating said rod to produce forces additive and subtractive to that produced by said gas pressure.

3. Device of claim 2 wherein said electromagnetic coil surrounds a portion of said rod, said rod being adapted to vibrate when said coil is energized with alternating current.

4. Device of claim 1 wherein said rod is supported at the openings in said housing by gas bearings created by the passage of gas through said openings and around said rod.

5. Device for developing and controlling mechanical force comprising a housing, openings in said housing adapted to accommodate a rod, a rod extending through said housing and out said openings, said rod being supported at the openings in said housing by gas bearings created by passage of gas through said openings and around said rod and said rod being of greater diameter at one of said openings than at the other, means communicating with said housing for maintaining gas pressure above or below atmospheric in said housing, means for limiting the extent of axial movement of said rod in said housing and means for moving said housing between predetermined limits.

6. Device for developing and controlling mechanical force comprising a housing, openings in said housing adapted to accommodate a rod, a rod extending through said housing and out said openings, said rod being supported at the openings in said housing by gas bearings created by passage of gas through said openings and around said rod and said rod being of greater diameter at one of said openings than at the other, means communicating with said housing for maintaining gas pressure above or below atmospheric in said housing, means for limiting the extent of axial movement of said rod in said housing, means for moving said housing vertically between predetermined limits and means including an electromagnetic coil adapted for axially vibrating said rod to produce forces additive and subtractive to that produced by said gas pressure.

7. Device for developing and controlling mechanical force comprising a housing, openings in said housing adapted to accommodate a rod, a rod extending through said housing and out said openings, said rod being of greater diameter at one of said openings than at the other, and said openings being sufficiently larger in diameter than the accommodated portions of said rod to permit passage of gas therethrough, means communicating with said housing for maintaining gas pressure above or below atmospheric in said housing, means for limiting the extent of axial movement of said rod in said housing, means for moving said housing vertically between predetermined limits and means including an electromagnetic coil adapted for axially vibrating said rod to produce forces additive and subtractive to that produced by said gas pressure.

8. Device of claim 7 wherein said vibrating means is an electromagnetic coil surrounding a portion of said rod.

9. Device for bonding wire to semi-conductor elements comprising a source of wire, a bonding tool, means for feeding wire to said bonding tool, means for axially moving said bonding tool, said latter means comprising a housing, openings in said housing adapted to accommodate a rod, a rod extending through said housing and out said openings and having said tool secured to one end thereof, said rod being of greater diameter at one of said openings than the other and said openings being sufficiently larger in diameter than the accommodated portions of said rod to permit passage of gas therethrough, means communicating with said housing for maintaining gas pressure above or below atmospheric in said housing, means for limiting the extent of axial movement of said rod in said housing and means for moving said housing between predetermined limits.

10. Device for bonding dies to semi-conductor elements comprising a bonding tool having a hollow tip, means for axially moving said bonding tool, said means comprising a housing, openings in said housing adapted to accommodate a rod, a hollow rod extending through said housing and out said openings and having said tool secured to one end thereof with said tip communicating with the hollow portion of said rod, said rod being of greater diameter at one of said openings than the other and said openings being sufficiently larger in diameter than the accommodated portion of said rod to permit passage of gas therethrough, a source of reduced pressure communicating with the interior of said housing and hollow rod, means for limiting the extent of axial movement of said rod in said housing, means for moving said housing vertically between predetermined limits and means including an electromagnetic coil adapted for axially vibrating said rod to produce forces additive and subtractive to that produced by said gas pressure.

No references cited.

JOHN F. CAMPBELL, *Primary Examiner.*

M. L. FAIGUS, *Assistant Examiner.*